Patented Dec. 8, 1953

2,662,077

UNITED STATES PATENT OFFICE 2,662,077

LOWER ALKANOIC ACID ESTERS OF HYALURONIC ACID AND THE PRODUCTION THEREOF

Zareh Hadidian, Needham, Mass., and Norman W. Pirie, Harpenden, England, assignors to G. D. Searle & Co., Chicago, Ill., a corporation of Illinois No Drawing. Application January 15, 1949, Serial No. 71,226

8 Claims. (Cl. 260—211)

This invention relates to inhibitors of the enzyme hyaluronidase, and to processes for preparing the same. It further relates to inhibitors of hyaluronidase prepared by chemical treatment of hyaluronic acid, particularly by acylation and nitration of hyaluronic acid and by de-acylation of acylated hyaluronic acid and denitration of nitrated hyaluronic acid.

This application is a continuation-in-part of our copending application Serial No. 6,014, filed February 3, 1948.

Hyaluronic acid is a mucopolysaccharide which constitutes part of the connective tissue of cells of animals and humans. It is composed for the most part of glucuronic acid and acetylglucosamine. A specific enzyme, hyaluronidase, exists in certain bacteria, venoms, spermatazoa, and other sources and plays a role in the process of invasion of cells and tissues by depolymerization of hyaluronic acid, the ground substance of connective tissue. Hyaluronic acid has been isolated with varying properties from umbilical cords, skin, vitreous humor, synovial fluid, tumors and hemolytic streptococci.

Hyaluronidase is believed to take part in a number of important processes, including conception, and invasion by pathogenic organisms. It is also believed to be a factor in rheumatoid arthritis, causing reduction in viscosity by hydrolysis or depolymerization of the ground substance of the human mesenchyme in which rheumatic processes are predominantly manifested. Inhibitors of the enzyme hyaluronidase are of value as contraceptives and for the prevention of invasion by micro-organisms, and also as possible therapeutic agents in the treatment of arthritis. Hyaluronidase inhibitors are furthermore useful as agents for preventing the coagulation of blood. It is the object of this invention to provide such enzyme inhibitors and also efficient methods for their production.

We have discovered that the substances obtained by nitration and by acylation of hyaluronic acid have the properties of inhibiting the action of hyaluronidase. We have further discovered that the substances obtained by de-acylating or denitrating such substances, as by reaction with alcoholic alkali, are also hyaluronidase inhibitors.

The process of nitration of hyaluronic acid is preferably carried out in the cold with fuming nitric acid. The reaction proceeds rapidly and can be arrested by the addition of a large excess of ice. The addition of ice dilutes the acid, stopping the reaction and precipitating the acid-insoluble nitrate. The acid-soluble nitrate remains in solution in the dilute nitric acid and may be isolated by neutralization, evaporation and dialysis.

The ratio of acid-soluble to acid-insoluble nitrate varies from preparation to preparation. When hyaluronic acid of low viscosity is used as the starting material (e. g., with a relative viscosity of 1.4 for a 1-gram per liter solution measured in the presence of salt) there is little acid-insoluble product. When even less viscous fractions are used there is no acid-insoluble material at all. It is possible, therefore, that all the acid-soluble material is derived from the less viscous components of an initially inhomogeneous hyaluronic acid. It is unlikely that this is the sole origin; for if the acid-insoluble nitrate is dried by sublimation and nitrated over again by the method described, a further quantity of soluble nitrate is formed. Some degradation of the molecule during nitration is to be expected, and this explanation of the origin of some of the soluble nitrate is borne out by the increased proportion of product in that form if the nitration is continued for longer than 15 minutes. The sum of the weights of nitrate in both forms is about equal to the starting weight of hyaluronic acid and, when highly viscous hyaluronic acid is used, 85% is in the acid-insoluble form.

Nitration generally leads to some fall in the viscosity of hyaluronic acid. The extent of this fall is variable but in general the viscosity increment of the acid-insoluble nitrate is about half that of the parent hyaluronic acid. The acid-soluble nitrate is much less viscous. Nitrated hyaluronic acid, of both types, can usually be salted out from neutral solution by ammonium sulfate. With the acid-insoluble product, precipitation begins at about one-tenth of saturation and is complete at one-third of saturation. The more readily precipitated fractions are the more viscous; and they are precipitated more fully by lower concentrations of ammonium sulfate than the less readily precipitated fraction. Preparations of very low viscosity may not precipitate at one-half of saturation. It is clear, therefore, that the nitrate is an inhomogeneous mixture but it is not clear whether this reflects an original inhomogeneity of the parent hyaluronic acid or is due to destruction during the nitration. Precipitation of the acid-soluble nitrates derived from hyaluronic acid preparations of very low initial viscosity does not start until one-third saturation by ammonium sulfate. Salting out does not therefore seem to be a useful alternative to neutralization, evaporation and dialysis in the preparation of acid-soluble nitrates because, although the acid-insoluble nitrate is precipitated by saturated sodium nitrate, the soluble nitrates are not, and the high nitrate concentration confuses ammonium sulfate precipitation. The nitrates contain about 6–11% of nitrogen and 4.5–7% of acetyl.

Hyaluronic acid is not salted out by ammonium sulfate from solutions containing no other component but it can be salted out if pyridine or some forms of protein are also present. The nitrates behave similarly for, although esterification of the hydroxyls has made the nitrates sufficiently hydrophobic to be salted out, they can be salted out at lower concentrations of ammonium sulfate in the presence of pyridine.

Acetylation of hyaluronic acid is most efficiently achieved by (1) treatment with acetic acid to cause it to swell, followed by reaction with acetic anhydride or acetyl chloride in the presence of sulfuric acid, with warming under certain circumstances where a product of high acetyl content is sought, or (2) treatment with formamide to cause swelling, followed by acetylation in pyridine. The products made by the two methods vary somewhat in their properties, but all such substances have hyaluronidase-inhibiting qualities. While acetylation is simple and conveniently carried out and therefore is preferred, we also can acylate hyaluronic acid with other common acylating agents such as propionic anhydride, butyryl chloride, benzoyl chloride, benzoic anhydride and the like. The acylated material has an acyl content of about 14–36% and a nitrogen content of about 2–3.5%.

De-acylation and denitration are preferably accomplished by reaction of the hyaluronic acid derivative with alcoholic KOH or NaOH, generally at ordinary temperatures. Besides alcoholic alkali, methanolic potash, isopropyl alcoholic potash, and methanolic caustic soda may be used. Dilute solutions of alkali metal hydroxides in other lower aliphatic alcohols, as well as in water-soluble organic solvents such as acetone and dioxane, can also be used for de-esterification. De-acylation and denitration, by the foregoing methods, are referred to herein as de-esterification. Esterification as used herein means the nitration and acylation of hyaluronic acids by the foregoing methods. The de-esterified material has a nitrogen content of about 1.5–4% and an acyl content of 5.5–8.5%.

The term relative viscosity is used in this application to mean the ratio of the flow time of a given concentration of hyaluronic acid in a salt solution to the flow time of the salt solution alone. The term viscosity increment is the value of the relative viscosity minus one, and is a measure of the increase in viscosity due to hyaluronic acid. The relative viscosities are measured at a concentration of 0.3 g./l. and converted to a concentration of 1 g./l. by the following formula $$V = 1 + \frac{V'-1}{C}$$

wherein V is the relative viscosity at a concentration of 1 g./l., V' is the relative viscosity at a given concentration, and C is the given concentration expressed in grams per liter.

Viscosity measurements are made in Ostwald viscosimeters at 25° centigrade. The standard ionic environment consists of 0.05 M sodium chloride and 0.05 M phosphate buffer at pH 7.0. Small variations in salt concentration in this region have little effect on viscosity.

The loss of viscosity of hyaluronic acid is used to follow the course of hyaluronidase action. By the same method the effects of hyaluronidase inhibitors can be observed. This method has the primary advantage that loss of viscosity is the first change that can be recognized during the enzymic decomposition of hyaluronic acid. The time required for the viscosity to fall half way from the initial to the presumed final value has been taken as a measure of the rate of enzyme action. The measurement of "half time" is conventional in studies on hyaluronidase and has been adopted for convenience.

Since no method exists for direct estimation of hyaluronidase, the course of the reaction between it and an inhibitor has to be followed by the indirect method of determining the amount of hyaluronidase that is made unavailable for the hyaluronic acid-hyaluronidase reaction in the presence of the inhibitor or after the hyaluronidase has been exposed to the action of the inhibitor for a given period of time. If, then, one works in a region where there is a linear relationship between hyaluronidase concentration and the rate of loss of viscosity by hyaluronic acid, one can consider this rate as a direct measure of the amount of active hyaluronidase in the system. The range over which such a relation exists varies with different preparations of hyaluronic acid tested at the same concentration. With highly viscous preparations and with the partially purified enzyme preparation that we use, deviation from linearity is slight up to an enzyme concentration of 8 mg./l. With less viscous preparations this range may extend up to 50 mg./l. The following methods are used in estimating inhibitory action: in instances where the length of exposure of the enzyme to the inhibitor is of little or no consequence, the enzyme is introduced into a mixture containing both inhibitor and substrate, and the subsequent viscosity changes followed; where the extent of inhibition is dependent on the length of exposure of the enzyme to the inhibitor, as in the case of the inhibition by serum, the enzyme and the inhibitor are incubated together under the proper salt and pH conditions for a given length of time, then the substrate is introduced into the mixture, and the course of the reaction followed. The extent of inhibition is determined from the ratio of the half time of the reaction with inhibitor to that without. Thus a threefold inhibition (or an inhibition factor of 3) would be obtained in a half time of 600 seconds is obtained with inhibitor as compared with 200 seconds without. The reciprocal of this ratio is the fraction of the initial enzyme concentration that is active. Partially purified bull testis enzyme is used in all these experiments.

Nitrates and acetates that have been made from viscous hyaluronic acid retain much of their initial viscosity. The effect of hyaluronidase on them can therefore be tested in the usual way. The viscosity of nitrates is not reduced by hyaluronidase and the viscosity of acetates often falls at first and then stays constant. We look on acetates behaving in this way as mixtures of material that can be attacked and material that is neither attacked nor inhibits the reaction.

The inhibition is measured by mixing suitable amounts of inhibitor with hyaluronic acid and then adding 50 micrograms of hyaluronidase per 4 ml. of solution. There is a slight increase in the inhibition if the enzyme and inhibitor are mixed first, but in this instance the extent of inhibition is not increased by allowing the enzyme and ester to be in contact for more than the time necessary for mixing. Some comparable results are collected in the table. Values are given for only one concentration of each inhibitor because the inhibition is proportional to the concentration of inhibitor. The table shows that acetates generally inhibit weakly, and the most active are partially acetylated products. On partial deacetylation the inhibition always increases. The results with nitric esters are more systematic; all of them inhibit. Attempts to get less nitration by using a smaller ratio of nitric acid to hyaluronic acid or by allowing the nitration to proceed for a shorter time have led to less active products. The acid-soluble fractions from the nitration of viscous material and the acid-soluble nitrates of non-viscous material are stronger inhibitors than the acid-insoluble nitrates. By suitably controlled removal of nitrate groups with alkali and alcohol the inhibitory power is substantially increased; but it is clear from the table that the intensity of the alkali treatment is of importance and that too drastic a treatment leads to a weaker inhibitor. For comparison the results of experiments with non-viscous hyaluronic acid and heparin are also included in the table. Many non-viscous preparations of varied origin have been tested and none has been found with a significantly greater inhibitory power than the one cited.

Our tests are made at 25° C. with hyaluronic acid having a relative viscosity of 7–8 for a 1 g./l. solution in 0.05 M NaCl and 0.05 M pH 7 phosphate buffer; although experiments described in the next paragraph show that there is more complete inhibition with smaller concentrations of phosphate. The same sample of dried partially purified hyaluronidase from bull testes was used throughout at 12.5 mg./l. Similar experiments have been made with larger and smaller concentrations of enzyme, at 37° C. and with samples of hyaluronic acid having a relative viscosity as low as 2 for the 1 g./l. solution. These variations in the conditions have not significantly affected the amount of inhibition observed.

Variations in phosphate and sodium chloride concentration, however, have a marked effect on inhibition by the esters. Several of these, including an acid-soluble nitrate, an acetate, a denitrated nitrate and a de-acetylated acetate, were tested in 0.05 M NaCl with phosphate concentrations varying between 0.013 M and 0.24 M; and in 0.05 phosphate with NaCl concentrations varying within the same range. Within this range there is an increasing inhibitory activity with decreasing salt concentration. None show a significant inhibitory activity in 0.05 M NaCl and 0.24 M phosphate and all show maximum activity in 0.05 M NaCl and 0.013 M phosphate; but they all follow different courses between these extremes. Products with identical inhibitory activity under our standard testing conditions may differ by a factor or two, at lower phosphate concentrations.

TABLE

| Description of Inhibitor | Concentration in g./l. | Inhibition Factor |
|---|---|---|
| Viscous hyaluronic acid acetylated by sulfuric method for 60 mins. 33% acetyl. | 0.1 | 1.5 |
| Above product de-acetylated for 15 mins. with 2 g./l. KOH. 14% acetyl | 0.1 | 6 |
| Viscous hyaluronic acid acetylated by sulfuric method for 10 mins. 18% acetyl | 0.1 | 4 |
| Acid-soluble product from nitration of viscous hyaluronic acid | 0.01 | 3.5 |
| Acid-insoluble part of the same nitration | 0.1 | 7.3 |
| Acid-soluble product from nitration of viscous hyaluronic acid | 0.03 | 3.0 |
| Acid-insoluble part of the same nitration | 0.03 | 2.2 |
| Above insoluble product denitrated for 2 h. with: | | |
| 0.07 g./l. KOH | 0.005 | 5 |
| 2.5 g./l. KOH | 0.004 | 7.5 |
| 7.5 g./l. KOH | 0.03 | 2.2 |
| Nitrated non-viscous hyaluronic acid | 0.01 | 5 |
| The same non-viscous hyaluronic acid before nitration | 0.1 | 2 |
| Heparin | 0.1 | 2 |

In these experiments 2 ml. of a 0.6 g./l. solution of hyaluronic acid in 0.1 M NaCl and 0.1 M pH 7 phosphate buffer were mixed with 1 ml. of a solution of the inhibitor at four times the concentration specified in the second column. 1 ml. of a 50 mg./l. solution of hyaluronidase was then added and the flow time in an Ostwald viscosimeter was measured at various intervals. The half time was found in the usual way and the amount of inhibition set out in the third column is derived by dividing the half time found in the presence of the inhibitor by that found in a control experiment with enzyme and subtrate alone.

Our invention is further disclosed by the following examples, which are intended only as illustrations of our products and processes and which in no way limit our invention in spirit or scope. The parts are given as parts by weight.

Example 1

Dry hyaluronic acid (all samples tested do not precipitate out of ½-saturated ammonium sulfate solution, but precipitate out of 80% alcohol), with the loose open structure that it has after drying by sublimation, is cooled in a freezing mixture to about −10° C. Sixty parts of fuming nitric acid (specific gravity 1.59) also cooled to −10° C. are added and the mixture is maintained at −10° C. for 15 minutes with occasional stirring. All the hyaluronic acid dissolves in a few minutes. Three to four hundred parts of ice are now added with assiduous stirring. The temperature falls still farther and a white curd separates from a brilliant blue fluid. As soon as most of the ice has melted and all pockets of undiluted nitric acid in the curd have been broken up, the mixture is centrifuged for a few minutes and the solid is washed three or four times on the centrifuge with ice water. It is kneaded carefully each time to get rid of as much nitric acid as possible, and the washing is continued until the wash water can be neutralized by a drop or two of 0.1 N sodium hydroxide. The solid is now suspended in water and brought into solution by adding enough NaOH to bring the pH to 6–7. This pale yellow, viscous fluid will be referred to as acid-insoluble nitrate.

All of the supernatant fluids are mixed and kept cold. They are neutralized with 20% NaOH with vigorous stirring and cooling so that the temperature never rises above 20° C. during the neutralization. The fluid, at pH 6, is concentrated by heating in a draft of air until sodium nitrate begins to crystallize out. It is then dialyzed for 10–20 hours to remove most of the nitrate, concentrated again, and redialyzed. At this stage the solution from 100 mg. of hyaluronic acid has a volume of 2–3 ml. The solution remaining after thorough dialysis will be referred to as acid-soluble nitrate.

The nitrated hyaluronic acid preparations, when dried by evaporation, burn in a flash and their nitrogen content (Dumas) rises from 3–4% to 8.6%. If hyaluronic acid has the structure generally assigned to it, a chain of alternate glucuronic acid and acetylglucosamine residues connected by glucoside linkages, there are four free hydroxyls for each repeating disaccharide unit. The sodium salt of the tetranitrate that could be made from such a substance would contain 12% of nitrogen and that of the dinitrate, 8.55%. Esterification of the —OH groups in this way does not apparently affect the N-acetyl group, for the acetyl content falls from 10–11% to 7–8%. The value to be expected for the dinitrate is 8.7%. Control experiments show that neither nitrous nor nitric acids, in amounts comparable to those present in a hydrolysate, are estimated as volatile acid after hydrolysis and distillation by the procedures used on these samples. On the other hand direct estimation, by the Elson and Morgan method (Biochem. J., 27:1824 [1933]), on the nitrated material shows an apparent disappearance of the glucosamine. This result is due to the action of the nitric acid liberated during hydrolysis. The same disappearance can be brought about by hydrolyzing normal hyaluronic acid in the presence of a quarter of its weight of sodium nitrate—an amount corresponding to four nitrate groups. Furthermore, de-esterification, by the method described in Example 7, restores the apparent glucosamine content and hydrolysis in the presence of a reducing agent such as hydriodic acid protects the glucosamine to a great extent from destruction. Fuming nitric acid probably acts to some extent as an oxidizing as well as a nitrating agent but it is clear that no oxidation involving the glucosamine is going on to an extent at all comparable to that found by Skanse and Sandblad (Acta Physiol. Scandinav. 6:37 [1943]) to accompany peroxide oxidation.

*Example 2*

A. A sample of hyaluronic acid obtained from pig umbilical cords (having a relative viscosity of 1.08, nitrogen content of 3.5%, acetyl assay of 7.7% and glucosamine content of 31.4%) is nitrated as in Example 1. The nitrated hyaluronic acid obtained by this procedure has an acetyl assay of 6.2% and nitrogen assay of 9.3%. It is insoluble in N/10 acid and ½-saturated ammonium sulfate solution. It is soluble in 80% aqueous alcohol and N/10 sodium hydroxide. It has a relative viscosity at 0.3 g./l. of 1.08 and a hyaluronidase-inhibition factor of 2 at a concentration of 0.03 g./l.

B. A sample of hyaluronic acid obtained from pig umbilical cords (relative viscosity 1.38, nitrogen 3.2%, acetyl 10.2%, glucosamine 37.9%) is nitrated as in A. The product has 7.3% nitrogen and is insoluble in N/10 acid and ½-saturated ammonium sulfate solution. It is soluble in 80% alcohol and N/10 sodium hydroxide solution. At a concentration of 0.03 g./l. it has an inhibition factor of 1.6.

C. Another sample of pig cord hyaluronic acid treated as in A gives a nitrated product of 6.4% nitrogen which is insoluble in ½-saturated ammonium sulfate solution and soluble in N/10 acid, 80% alcohol and N/10 sodium hydroxide solution. It has a relative viscosity at 0.3 g./l. of 1.10 and an inhibition factor at 0.03 g./l. of 5.

D. A sample of hyaluronic acid (relative viscosity 1.36) obtained from human umbilical cords is nitrated and worked up according to Example 1. The nitrated material thus obtained has 10.2% nitrogen and is insoluble in ½-saturated ammonium sulfate solution. It is soluble in N/10 acid, 80% alcohol, N/10 aqueous sodium hydroxide and alcoholic alkali, eventually precipitating from the latter. It has a relative viscosity of 1.02 at 0.3 g./l. and an inhibition factor of 4.5 at 0.03 g./l.

E. Another sample of human cord hyaluronic acid (relative viscosity 1.5) treated as in D gives a product of 4.9% acetyl and 6.9% nitrogen which is insoluble in N/10 acid. It is soluble in 80% alcohol, ½-saturated ammonium sulfate solution, N/10 sodium hydroxide solution and alkaline alcohol; from the latter it eventually precipitates, as do the products of Examples 2A, 2B and 2C. It has an inhibition factor of 3 at 0.03 g./l.

F. Pig cord hyaluronic acid (relative viscosity 1.15, nitrogen 3.6%, acetyl 7.8%, glucosamine 29%) upon nitration as in Example 1 yields a nitration product having 6.0% acetyl, 4.7% nitrogen and which is soluble in N/10 acid, 80% alcohol, ½-saturated ammonium sulfate solution, N/10 sodium hydroxide solution and alcoholic alkali, eventually precipitating from the latter. It has a relative viscosity of 1.01 at 0.3 g./l. and an inhibition factor of 2.1 at 0.03 g./l.

Another sample of the same hyaluronic acid upon similar treatment gives a product of 6.5% acetyl and 5.9% nitrogen. The nitrated product is insoluble in N/10 acid and ½-saturated ammonium sulfate solution. It is soluble in 80% alcohol, N/10 sodium hydroxide solution and alcoholic alkali. Its relative viscosity is 1.11 at 0.3 g./l. and its inhibition factor is 1.5 at 0.03 g./l.

*Example 3*

Hyaluronic acid is swollen with acetic acid by adding glacial acetic acid in a thin stream to a 3–10 g./l. solution of hyaluronic acid. Mixing is complete until about 2 volumes have been added, after which precipitation begins and is substantially complete with 4 or 5 volumes. The mixture is centrifuged and the solid washed with acetic acid and used immediately. This precipitation does not lead to any significant fractionation of the hyaluronic acid, for only about 3% of the starting material is found in the solution when this is evaporated to dryness. This soluble fraction has the normal nitrogen and glucosamine content but its viscosity is low. The precipitate on the other hand, if dialyzed immediately, gives a solution with the original viscosity.

The fibrous clot of hyaluronic acid is pressed as free from acetic acid as possible and added to 200 times its weight of a mixture of 1 part of concentrated sulfuric acid, 90 of acetic anhydride and 120 of benzene. There is little or no solution of the hyaluronic acid, and, after a suitable interval, the mixture is centrifuged and the solid suspended in water and dialyzed. If acetylation is allowed to proceed for a few minutes only, the product has an acetyl content of 16–20%; after 40 minutes at 22° C. it rises to 25–33% and is not increased by longer acetylation at that temperature. By raising the temperature to 60° C. for 15 minutes, after acetylation has proceeded for an hour at 25° C., the acetyl content can be raised to 36%. Acetyl determinations are made by hydrolyzing a sample for 75 minutes at 100° C. in 2.5 N $H_2SO_4$, steam-distilling the mixture and titrating the distillate with N/70 NaOH, and include both O-acetyl and N-acetyl. Theoretical value for the tri-O-acetyl derivative of a polysaccharide built up from equal quantities of glucuronic acid and N-acetyl glucosamine is 34% and for the tetra-O-acetyl derivative 39.4%. It would therefore appear that, as in the case of nitration, esterification remains incomplete. Products that have been acetylated for a few hours only are still soluble in water over the whole pH range but those that have been acetylated at room temperature for many hours, or have been heated to 60° C. during acetylation, are not soluble on the acid side of neutrality. There is a progressive fall in viscosity during acetylation. Products acetylated for a few minutes only retain 70–80% of the original viscosity increment whereas the tri-O-acetates retain only 10% or less.

Example 4

A. Human cord hyaluronic acid (relative viscosity 1.30) is acetylated according to the procedure of Example 3 for 60 minutes at 25° C. and for 15 minutes at 55° C. The acetylated material is isolated as in Example 3. It has 20% acetyl and 2.4% nitrogen. It is soluble in N/10 acid, 80% alcohol and N/10 sodium hydroxide solution, and insoluble in ½-saturated ammonium sulfate solution. It dissolves in alcoholic alkali but precipitates therefrom in time. It has a relative viscosity of 1.02 at 0.3 g./l. and an inhibition factor of 1.8 at 0.1 g./l.

B. Another sample of hyaluronic acid (relative viscosity 1.98) from human cords is acetylated as in A for 30 minutes at 27° C. The product so obtained has 30% acetyl and 2.3% nitrogen. It has a relative viscosity of 1.08 at 0.3 g./l. and an inhibition factor of 1.8 at 0.1 g./l.

C. Hyaluronic acid (relative viscosity 1.87, nitrogen 2.8%, acetyl 11.2% and glucosamine 41.7%) is acetylated by the method of Example 3 for 60 minutes at 27° C. The product thus obtained has 23% acetyl and 2.0% nitrogen. It is soluble in N/10 acid, 80% alcohol, N/10 sodium hydroxide and alcoholic alkali, precipitating eventually from the latter. It is insoluble in ½-saturated ammonium sulfate solution. Its relative viscosity at 0.3 g./l. is 1.03 and its inhibition factor at 0.1 g./l. is 1.6.

D. A hyaluronic acid fraction (relative viscosity 1.98) from human cords is acetylated as in Example 3 for 45 minutes at 27° C. The product has 18% acetyl, 2.4% nitrogen, and the same solubility characteristics as the material in Example 4C. Its relative viscosity is 1.32 at 0.3 g./l. and its inhibition factor is 1.5 at 0.1 g./l.

E. A sample of pig cord hyaluronic acid is acetylated as in Example 3. The acetylated material has 18% acetyl and 2.4% nitrogen. It is soluble in N/10 acid, 80% alcohol, ½-saturated ammonium sulfate, N/10 alkali and alcoholic alkali. Its relative viscosity at 0.3 g./l. is 1.04 and its inhibition factor at 0.1 g./l. is 2.0.

Example 5

Hyaluronic acid that has been dried by sublimation does not change its appearance when left for a few hours at 20° C. in formamide but at 40° C. it swells somewhat and at 50° C. turns in an hour to a viscous dough when suspended in ten times its weight of formamide. This dough can be mixed with an equal volume of pyridine by stirring for a few minutes. The plastic, rather than fluid, mixture is now mixed with half its volume of acetic anhydride, which causes an initial shrinkage but is incorporated into the mixture in a few minutes. As in the other method of acetylation (Example 3) the properties of the final product depend on the duration of acetylation and the temperature at which it proceeds. The mixture is stirred with three times its weight of ice and when brought to pH 2 with 5 N HCl, a soft curd separates. The fluid is dialyzed. If acetylation has proceeded for an hour at 20° C. this acid-soluble product has an acetyl content of 14–16% while after 3 hours at 30° C. it rises to 30%. In neither case has it any significant viscosity. The curd is not soluble at neutrality in the absence of salt and is only partly soluble in the presence of salt; but it swells slowly to give a suspension of gelatinous particles, which dissolve at pH 9–10. The solutions have only a fifth of the viscosity of the parent hyaluronic acid. All these acetylated fractions coagulate with strong acid, and like the nitrates, they can be precipitated with ammonium sulfate.

Example 6

A. Hyaluronic acid of relative viscosity 1.3 from human cords is acetylated in formamide as in Example 5. The acetylated product contains 17% acetyl and 3.5% nitrogen. It is soluble in N/10 acid, 80% alcohol and N/10 sodium hydroxide solution. It is soluble also in alcoholic alkali but precipitates therefrom eventually. It is insoluble in ½-saturated ammonium sulfate solution. Its relative viscosity at 0.3 g./l. is 1.13 and its inhibition factor at 0.1 g./l. is 1.4.

B. A sample of hyaluronic acid from pig cords (Example 2F) is acetylated according to the method of Example 5. The product so obtained assays 18% acetyl and 3.0–3.5% nitrogen. It has the same solubility properties as the product of Example 6A. Its relative viscosity is 1.04 at 0.3 g./l. and its inhibition factor at 0.1 g./l. is 1.7.

C. Hyaluronic acid of relative viscosity 1.3 from human cords is swollen in formamide and pyridine as in Example 5. The resulting mixture is mixed with one-half its volume of propionyl chloride and is stirred for 2 hours at 20° C. It is then diluted with 4 volumes of ice and brought to pH 2 with 5 N hydrochloric acid. The curd that separates is removed and the clear aqueous fluid is dialyzed. The dialyzed solution is evaporated to dryness under high vacuum and at freezing temperature. The propionylated hyaluronic acid so obtained has little viscosity. It is soluble in N/10 acid, N/10 alkali and in 80% alcohol, but is insoluble in ½-saturated ammonium sulfate solution.

Example 7

The nitrates and acetates of hyaluronic acid can be partly de-esterified without extensive degradation by exposure to alkali in the presence of alcohol. Solutions of either ester containing 3–10 g./l. are mixed with ten volumes of alcohol. With the esters, unlike hyaluronic acid itself, no precipitate separates even on the addition of a salt such as potassium acetate. The addition of alcoholic potassium hydroxide at 22° C. leads to the appearance of an opalescence; and later, after a time interval depending on the amount of alkali added, of a precipitate. For example an alcoholic solution containing 0.8 g./l. of a moderately viscous nitrate (rel. visc. 2.3 at 1 g./l. in salt) gives an immediate precipitate with 7 g./l. KOH. With 2.5 g./l. KOH precipitation takes 2 hours, and with 0.7 g./l. precipitation occurs only on the addition of some salt. Similarly with the acetate there is immediate precipitation with 1-2 g./l. KOH but with less than this amount precipitation is delayed. Under these conditions de-esterification remains incomplete as determined from the nitrogen and acetyl content of these products. The immediate purpose of the work, the making of substances that inhibit hyaluronidase, is however satisfied.

*Example 8*

A. The nitrated product of Example 2E is de-esterified in alcoholic KOH (2.5 g./l.) for 95 minutes according to the procedure of Example 7. The resulting product contains 5.9% acetyl and 3.8% nitrogen. It is soluble in N/10 acid, 80% alcohol, ½-saturated ammonium sulfate solution and N/10 sodium hydroxide. It is insoluble in alcoholic alkali. Its inhibition factor is 8 at 0.03 g./l.

B. The acetylated product of Example 4A is de-esterified with alcoholic KOH (2.5 g./l.) for 75 minutes, according to Example 7. The product so obtained contains 7.4% acetyl and 2.3% nitrogen. It has the same solubility characteristics as the product of Example 8A. Its inhibition factor is 2.0 at 0.1 g./l.

C. The acetylated product of Example 6A is de-esterified in alcoholic KOH (2.0 g./l.) for 5 minutes. The resulting material assays 6.8% acetyl and 2.7% nitrogen. It has the same solubility properties as the product of Example 8A. Its relative viscosity at a concentration of 0.3 g./l. is 1.08 and its inhibition factor at 0.1 g./l. is 1.4.

D. Acetylated hyaluronic acid (Example 4C) is de-esterified by solution in alcoholic KOH (2.0 g./l.) for 5 minutes. The de-acylated material has 8.1% acetyl and 2.3% nitrogen. It is soluble in N/10 acid, 80% alcohol, ½-saturated ammonium sulfate and N/10 caustic solution. It has a relative viscosity of 1.04 at 0.3 g./l. and an inhibition factor of 6 at 0.1 g./l.

E. Acetylated hyaluronic acid (Example 4B) on treatment with alcoholic KOH (2.0 g./l.) for 5 minutes gives material of 7.0% acetyl content and 1.8% nitrogen content. It has the same solubility properties as the product of Example 8A. Its inhibition factor is 7.5 at 0.1 g./l.

We claim:

1. As a new composition of matter, a member of the group consisting of a lower alkanoic acid ester of hyaluronic acid, and salts thereof, wherein the acyl content is in the range of about 14% to 36%.

2. As a new composition of matter, acylated hyaluronic acid, wherein the acyl radical is a lower alkanoyl radical, said composition of matter having an acyl content in the range of about 14% to 36% and being characterized by its solubility in water, in dilute alkali and in 80% alcohol.

3. As a new composition of matter, acetylated hyaluronic acid, said composition of matter being characterized by its solubility in water, in dilute alkali and in 80% alcohol, and having an acetyl content in the range of about 14% to 36%.

4. The process of acylating hyaluronic acid which comprises reacting hyaluronic acid with a member of the group consisting of lower alkanoic acid halides and anhydrides in the presence of an acylation medium of the group consisting of (a) sulfuric acid and (b) formamide and pyridine, and isolating the ester so formed.

5. The process of acylating hyaluronic acid which comprises reacting hyaluronic acid with a lower alkanoic acid anhydride in the presence of an acylation medium of the group consisting of (a) sulfuric acid and (b) formamide and pyridine, and isolating the ester so formed.

6. The process of acetylating hyaluronic acid which comprises reacting hyaluronic acid with acetic anhydride in the presence of an acylation medium of the group consisting of (a) sulfuric acid and (b) formamide and pyridine, and isolating the ester so formed.

7. The process of acetylating hyaluronic acid which comprises reacting hyaluronic acid with acetic anhydride in the presence of sulfuric acid and isolating the ester so formed.

8. The process of acetylating hyaluronic acid which comprises reacting hyaluronic acid with acetic anhydride in the presence of formamide and pyridine and isolating the ester so formed.

ZAREH HADIDIAN.
NORMAN W. PIRIE.

References Cited in the file of this patent

Chem. Abs., vol. 35 (1941), page 7013.

National Bur. of Standards "Polarimetry, Saccharimetry, and the Sugars," Circ. C440, 1942, pages 485-487.